United States Patent Office
3,779,951
Patented Dec. 18, 1973

3,779,951
METHOD FOR EXPANDING MICROSPHERES AND EXPANDABLE COMPOSITION
Robert J. Streu, Essexville, Mich., assignor to The Dow Chemical Company, Midland, Mich.
No Drawing. Continuation-in-part of abandoned application Ser. No. 82,102, Oct. 19, 1970. This application Nov. 21, 1972, Ser. No. 308,500
Int. Cl. B01j *13/02;* C08j *1/14, 1/26*
U.S. Cl. 260—2.5 B                           11 Claims

ABSTRACT OF THE DISCLOSURE

Thermoplastic microspheres are readily expanded to low densities by heating in water in the presence of a glycol or glycol derivative.

---

This aplication is a continuation-in-part of my co-pending application Ser. No. 82,102 filed Oct. 19, 1970, now abandoned.

Expandable synthetic resinous microspheres provide a convenient source of hollow, gas-filled synthetic resinous particles and are beneficially employed as fillers in synthetic resinous castings as bulking agents, in textiles and paper as thin insulating coatings and the like. Such expandable particles are well known and are set forth in U.S. Letters Patents 3,293,114; 3,401,475; 3,479,811; 3,488,714; 3,615,972; Canadian Pat. 890,501 and British Pat. 1,044,680. Expandable microspheres generally have diameters within the range of 1 to 50 microns and consist essentially of a synthetic resinous thermoplastic shell encapsulating therein a single droplet of a liquid expanding agent such as a low boiling hydrocarbon or other volatile material which is generally a non-solvent for the polymer. On heating the expandable microspheres to a temperature sufficient to cause heat plastification of the shell, the microspheres expand to form a hollow gas or vapor filled polymeric shell several times the diameter of the unexpanded sphere. Such microspheres are prepared in an aqueous polymerization system and oftentimes dried and expanded. In many instances, particularly where such microspheres are being employed in an aqueous system such as a coating system where it is desired to employ the microspheres in the expanded form, substantial difficulty has been encountered in obtaining satisfactorily expanded microspheres when they are heated in the presence of water. Generally, when microspheres are employed which expand at temperatures below the boiling point of water, an undesirably low degree of expansion is obtained if water-wetted microspheres are heated in water. If the water is removed; that is, the microspheres are dried and re-slurried and heated to a like temperature within a short period of time, generally a substantially greater degree of expansion is obtained. On standing at room temperature in the presence of water, the dried and re-slurried microspheres appear to lose their ability to expand in hot water.

It would be desirable if there were available an improved method for the preparation of thermoplastic expandable microspheres in the presence of water.

It would also be desirable if there were available an improved microsphere-containing aqueous composition which would readily permit expansion of the microspheres.

It would further be desirable if there were available a simple and direct technique for the expansion of expandable microspheres in the presence of water to relatively low densities.

These benefits and other advantages in accordance with the present invention are achieved employing an aqueous dispersion of expandable synthetic resinous microspheres, the microspheres having a thermoplastic shell symmetrically encapsulating therein a volatile liquid raising agent in an aqueous dispersing medium, the aqueous dispersing medium having dissolved therein at least 10 weight percent, based on the weight of the dispersing medium, of a propanol or an alcohol of the formula R—(OH)$_n$ where R is alkyl, aminoalkyl, alkylether, containing up to 6 carbon atoms and $n$ is an integer of from 1 to 4, or a mixture thereof, with the further limitation that when R is alkyl, $n$ is at least 2.

Also contemplated within the scope of the invention is a method for the expansion of expandable synthetic resinous microspheres, the microspheres having a synthetic resinous thermoplastic shell symmetrically encapsulating therein a volatile liquid raising agent and on heating being capable of expanding to form a monocellular particle, the steps of the method comprising providing a dispersion of expandable microspheres in an aqueous medium, the aqueous medium having dissolved therein at least 10 weight percent, based on the weight of the medium, of an alcohol selected from the group consisting of a propanol and an alcohol of the formula R—(OH)$_n$ where R is alkyl, aminoalkyl, alkylether containing up to 6 carbon atoms and $n$ is an integer of from 1 to 4, or mixtures thereof, with the further limitation that when R is alkyl, $n$ is at least 2, and heating the expandable microspheres in the presence of water to a temperature sufficient to cause expansion thereof to monocellular gas-filled particles.

A wide variety of expandable synthetic resinous microspheres may be employed in the practice of the present invention. Those which are suitable are any expandable synthetic resinous microspheres which heat plastify and expand below the boiling point of water. Typical microspheres are those having a shell of a copolymer of 75 weight percent vinylidene chloride and 25 weight percent acrylonitrile containing about 11 weight percent, based on the total weight of the microspheres, of isobutane; microspheres having a shell of 70 weight percent vinylidene chloride, 15 weight percent acrylonitrile and 15 weight percent methylmethacrylate and containing 14 weight percent isobutane. The expandable micropheres are well known in the art and various microspheres are described in the hereinbefore delineated patents, herewith incorporated by reference.

The hydroxyl-containing compounds useful in the present invention must be sufficiently soluble in water at 25° C. to form a 10 weight percent solution of the compound in water. The beneficial hydroxyl-containing compounds useful in the practice of the present invention are water soluble and contain at least 2 polar groups, such as hydroxyl, amino or an ether linkage. Typical compounds are ethylene glycol, propylene glycol, dipropylene glycol, and the methyl ether of ethylene glycol, triethanolamine, glycerine and the like.

Generally in the practice of the method of the invention, it is desirable to admix the hydroxyl-containing compound, water and microspheres by any convenient method and subsequently heat the microspheres to the expanding temperature. It is desirable that at least 10 weight percent of the hydroxyl-containing compound be present in the aqueous dispersing medium. The expandable microspheres may be heated directly in the dispersing medium, or alternately and desirably, the dispersing medium containing the hydroxyl compound may be removed from the microspheres such as by filtering. Such a filtering operation generally provides a wet cake which contains about equal parts of the microspheres and retained dispersing medium. The microspheres separated by filtration may then be added to water heated to the desired temperature to cause expansion. If desired, the water may contain binders such as, for example, styrene/butadiene latex particles. Generally in order to obtain optimum expansion, it is advantageous to employ at least 25 weight percent of the hydroxyl-containing compound in treating the expandable microspheres. The expandable microspheres may be treated with 100 percent of the hydroxyl-containing compound and subsequently dispersing the mixture in water. However, no substantial advantage is achieved and generally the viscosity of the hydroxyl-containing compound is higher than that of a diluted solution which can render the treatment somewhat inconvenient. Generally it is desirable that at room temperature the microspheres remain in the hydroxyl-containing compound dispersion for several hours, such as for a period of from about 5 to 24 hours, or up to several days in order to obtain maximum expansion of the particles. A substantial improvement in expansion characteristics are observed, however, when microspheres are admixed with an aqueous solution of the hdyroxyl-containing compound, immediately separated and heated in water.

The mechanism of the present invention is not clearly understood. However, at temperatures below the temperature at which the microspheres expand, generally the longer the period of treatment at a given temperature (up to about 24 hours), the lower the density of the resultant expanded microspheres.

In the following examples, all densities are true densities which are determined gravimetrically using a dispersion of the expanded microspheres in glycerine.

EXAMPLE 1

By way of further illustration, 100 parts by weight of expandable microsphere filter cake containing about 50 percent microspheres (the microspheres being 75 parts by weight vinylidene chloride, 25 parts by weight acrylonitrile and 10 parts by weight isobutane) and 50 percent water are admixed with 100 parts of glycerine and 100 parts of water and allowed to stand for 16 hours at about 24° C. At the end of that period of time, the microspheres are separated from the aqueous dispersed medium by means of a vacuum filter. The resultant wet filter cake is then slurried with agitation in water having a temperature of 75° C. Expanded microspheres are separated from the water by filtration and have a density of 4.05 pounds per cubic foot. When the foregoing procedure is repeated, with the exception that the glycerine is omitted, the microspheres obtained have a density of 51.8 pounds per cubic foot.

EXAMPLE 2

The procedure of Example 1 is repeated with the exception that ethylene glycol is employed instead of glycerine. The microspheres have a density of 3.82 pounds per cubic foot.

EXAMPLE 3

The procedure of Example 1 is repeated with the exception that propylene glycol is employed instead of glycerine. The microspheres obtained have a density of 4.2 pounds per cubic foot.

EXAMPLE 4

The procedure of Example 1 is employed with the exception that diethylene glycol is employed instead of glycerine. The resultant microspheres have a density of 4.39 pounds per cubic foot.

EXAMPLE 5

The procedure of Example 1 is repeated with the exception that dipropylene glycol is employed instead of glycerine. The microspheres obtained have a density of 4.07 pounds per cubic foot.

EXAMPLE 6

The procedure of Example 1 is repeated with the exception that the ethylether of ethylene glycol is employed. The microspheres have a density of 3.93 pounds per cubic foot.

EXAMPLE 7

The procedure of Example 1 is repeated with the exception that triethanolamine is employed instead of glycerine. The microspheres obtained have a density of 4.62 pounds per cubic foot.

EXAMPLE 8

The procedure of Example 1 is repeated with the exception that the microspheres employed have an outer shell composed of 70 parts by weight vinylidene chloride, 15 parts by weight acrylonitrile and 15 parts by weight methylmethacrylate and contain isobutane as the blowing agent. The microspheres obtained have a density of 4 pounds per cubic foot.

EXAMPLE 9

The procedure of Example 1 is repeated with the exception that n-propylalcohol is employed instead of glycerine. The density of the expanded microspheres is 14 pounds per cubic foot. Similar results are obtained using isopropylalcohol.

In a manner similar to the foregoing examples, other expandable microspheres which expand at temperatures below the boiling point of water are readily expanded in the presence of water employing the hereinbefore delineated hydroxyl-containing compounds.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A dispersion of readily expandable synthetic resinous thermoplastic microspheres, the microspheres having a thermoplastic shell symmetrically encapsulating therein a volatile liquid raising agent and being capable of expansion at a temperature below 100° C., the microspheres being dispersed in an aqueous dispersing medium having dissolved therein at least 10 weight percent, based on the weight of the dispersing medium of an alcohol of the formula R—$(OH)_n$ where R is alkyl, aminoalkyl, alkylether, containing up to 6 carbon atoms, and $n$ is an integer of from 1 to 4 or a mixture thereof, with the further limitation that when R is alkyl, $n$ is at least 2.

2. The composition of claim 1 wherein the alcohol is glycerine.

3. The composition of claim 2 wherein the alcohol is ethylene glycol.

4. The composition of claim 1 wherein the synthetic resinous thermoplastic shell is a polymer of vinylidene chloride and acrylonitrile.

5. The composition of claim 1 containing at least 25 weight percent of an alcohol.

6. A method for the expansion of expandable synthetic thermoplastic resinous microspheres, the micropheres having a synthetic resinous thermoplastic shell symmetrically encapsulating therein a volatile liquid raising agent and on heating being capable of expanding to form a monocellular particle, the steps of the method comprising providing a dispersion of expandable microspheres in an aqueous medium, the aqueous medium having dissolved therein at least 10 weight percent, based on the weight of the medium of a propanol and an alcohol of the formula R—$(OH)_n$ where R is alkyl, aminoalkyl, alkylether, containing up to 6 carbon atoms, and $n$ is an integer of from 1 to 4, or mixtures thereof, with the further limitation that when R is alkyl, $n$ is at least 2, and heating the expandable microspheres in the presence of water to a temperature sufficient to cause expansion thereof to monocellular gas-filled particles.

7. The method of claim 6 including the step of removing at least a major portion of the aqueous medium and adding the resultant wet, unexpanded microspheres to water heated to an expanding temperature.

8. The method of claim 6 wherein the alcohol is glycerine.

9. The method of claim 6 wherein the alcohol is ethylene glycol.

10. The method of claim 6 wherein the monocellular gas-filled particles are separated from the water.

11. The method of claim 6 wherein the synthetic resinous thermoplastic shell is a polymer of vinylidene chloride and acrylonitrile.

References Cited

UNITED STATES PATENTS

| 2,744,291 | 5/1956 | Stastny et al. | 260—2.5 B |
| 3,293,114 | 12/1966 | Kenaga et al. | 260—2.5 B |
| 3,479,811 | 11/1969 | Walters et al. | 260—2.5 B |
| 3,488,714 | 1/1970 | Walters et al. | 161—161 |
| 3,401,475 | 9/1968 | Morehouse et al. | 161—413 |
| 2,787,809 | 4/1957 | Stastny | 260—2.5 B |
| 3,615,972 | 10/1971 | Morehouse, Jr., et al. | 260—2.5 B |

MURRAY TILLMAN, Primary Examiner

M. FOELAK, Assistant Examiner

U.S. Cl. X.R.

117—36.7